US012697869B2

(12) United States Patent (10) Patent No.: US 12,697,869 B2
Jaussaud et al. (45) Date of Patent: Aug. 4, 2026

(54) FUEL STORAGE ASSEMBLY FOR A MOTOR VEHICLE

(71) Applicant: VOLVO TRUCK CORPORATION, Gothenburg (SE)

(72) Inventors: Jean-Paul Jaussaud, Luzinay (FR); Frédéric Grenier, La Talaudiere (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/952,196

(22) Filed: Nov. 19, 2024

(65) Prior Publication Data

US 2025/0170887 A1 May 29, 2025

(30) Foreign Application Priority Data

Nov. 28, 2023 (EP) .................................... 23212646

(51) Int. Cl.
*B60K 15/07* (2006.01)
*B60K 15/03* (2006.01)

(52) U.S. Cl.
CPC ........ *B60K 15/07* (2013.01); *B60K 15/03006* (2013.01); *B60K 15/03177* (2013.01)

(58) Field of Classification Search
CPC .......................... B60K 15/07; B60K 15/03006
See application file for complete search history.

(56) References Cited

U.S. PATENT DOCUMENTS 6,755,460 B1 * 6/2004 Marrs .................... B62D 33/00
296/180.2
6,986,494 B2 1/2006 Strasser
(Continued)

FOREIGN PATENT DOCUMENTS

CA 2621737 A1 * 10/2008 ............ F17C 13/083
CA 3224198 A1 * 12/2022 ............ B60K 15/07
(Continued)

OTHER PUBLICATIONS

Extended European Search Report in corresponding European Application No. 23212646.6 dated Mar. 1, 2024 (6 pages).
(Continued)

*Primary Examiner* — Nicole T Verley
(74) *Attorney, Agent, or Firm* — Jeffri A. Kaminski; Venable LLP

(57) ABSTRACT

A fuel storage assembly for a motor vehicle has four fuel tanks arranged to form each a corner of a substantially square cross-section of a tank array, a spacer arrangement keeps said fuel tanks apart, said spacer arrangement comprising at least one side bracket disposed along one of the vertical peripheral sides of the tank array, the at least one side bracket being arranged to be fixed to a vehicle chassis, and at least one central bracket disposed between the fuel tanks in the center of the tank array, at least one tensioning strap disposed around the fuel tanks to be secured at one first end and to a top part of the at least one side bracket and at one second end to a bottom part of the at least one side bracket, the at least one tensioning strap pressing the fuel tanks together in the tank array, a protecting element to cover one or more of the horizontal and vertical peripheral sides of the tank array. The protecting element is detachably fixed to the at least one tensioning strap.

15 Claims, 5 Drawing Sheets

(56) References Cited

U.S. PATENT DOCUMENTS

| | | | | |
|---|---|---|---|---|
| 11,660,956 | B2 | | 5/2023 | Fujii |
| 12,227,067 | B2 * | | 2/2025 | Sondre .................. B60K 15/07 |
| 2014/0069972 | A1 * | | 3/2014 | Willemsen ........... B60K 15/063 224/401 |
| 2017/0334288 | A1 * | | 11/2017 | Rike ..................... B60K 15/07 |
| 2024/0294064 | A1 * | | 9/2024 | Avadutala ........... B60K 15/067 |
| 2024/0359554 | A1 * | | 10/2024 | Hornback ........... B60K 15/067 |

FOREIGN PATENT DOCUMENTS

| | | | | | |
|---|---|---|---|---|---|
| CA | 3134244 | C | * | 2/2024 | ............. B60K 15/07 |
| CN | 118404977 | A | * | 7/2024 | ............. F17C 13/10 |
| CN | 222727812 | U | * | 4/2025 | |
| DE | 102006059977 | A1 | * | 6/2008 | ........... B60K 15/067 |
| DE | 102012022959 | A1 | * | 5/2013 | ........... B60K 15/067 |
| DE | 102017005448 | A1 | * | 12/2017 | ....... B60K 15/03006 |
| DE | 102017009199 | A1 | * | 4/2018 | ............. B60K 15/03 |
| DE | 102017003564 | A1 | * | 10/2018 | ........... B60K 15/067 |
| DE | 102022105364 | A1 | * | 9/2023 | ........... F17C 13/084 |
| DE | 102023101159 | A1 | * | 7/2024 | ........... B60K 15/067 |
| EP | 3078533 | A1 | * | 10/2016 | ............. B60K 15/07 |
| EP | 3496966 | A1 | | 6/2019 | |
| EP | 3517365 | B1 | * | 11/2020 | ............. B60R 3/005 |
| IT | 201800002116 | A1 | * | 7/2019 | ............. B60R 3/005 |
| JP | 2000515453 | A | * | 11/2000 | ........... B60K 15/067 |
| JP | 2019059422 | A | * | 4/2019 | |
| KR | 100612753 | B1 | * | 8/2006 | ........... B60K 15/067 |
| SE | 539829 | C2 | * | 12/2017 | ........... F17C 13/083 |
| SE | 1651099 | A1 | * | 2/2018 | ........... B60K 15/07 |
| SE | 540795 | C2 | * | 11/2018 | ........... B60K 15/067 |
| WO | WO-9802324 | A1 | * | 1/1998 | ........... B60K 15/067 |
| WO | WO-0024641 | A1 | * | 5/2000 | ........... B60K 15/07 |
| WO | WO-2007133213 | A1 | * | 11/2007 | ............. F16L 3/137 |
| WO | WO-2015175842 | A1 | * | 11/2015 | ........... F17C 13/083 |
| WO | WO-2015191918 | A1 | * | 12/2015 | ........... B62D 35/001 |
| WO | WO-2018030930 | A1 | * | 2/2018 | ............. B60K 15/07 |
| WO | WO-2018030931 | A1 | * | 2/2018 | ............. B60K 15/07 |
| WO | WO-2021115588 | A1 | * | 6/2021 | ............. B60K 15/07 |

OTHER PUBLICATIONS

European Communication pursuant to Article 94(3) EPC dated Mar. 5, 2026 in corresponding European Patent Application No. 23212646. 6, 7 pages.

* cited by examiner

FUEL STORAGE ASSEMBLY FOR A MOTOR VEHICLE

TECHNICAL FIELD

The disclosure relates generally to an energy storage unit for a motor vehicle. In particular aspects, the disclosure relates to a fuel storage assembly for a motor vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

The propulsion systems of vehicles are continuously developed to meet the demands from the market. A particular aspect relates to the emission of environmentally harmful exhaust gas. Therefore, vehicles propelled by an electric power generated by a fuel cell system have been increasingly popular, both for cars as well as for trucks and other heavy duty vehicles. The fuel cell system receives a fuel e.g. hydrogen to be able to generate the electric power. The fuel is contained in gas tanks connected to the vehicle. As a further alternative, a combustible gas, such as compressed natural gas (CNG), has been found a suitable propulsion fuel for vehicles in the form of trucks. This gas is also contained in gas tanks connected to the vehicle.

Said tanks are generally retained in tank assemblies comprising between 2 and 6 cylindrical tanks, and, preferably, 4 cylindrical tanks. Such tank assemblies may be assembled separately and the thus assembled tank assemblies may thereafter be attached to the vehicle.

An example of vehicle fuel tank assembly is disclosed in WO 2018/030931. In this example, the fuel tanks are held together by a bracket that is fixed to the vehicle chassis and by a tensioning strap mounted around the fuel tanks and fixed at its two ends to the bracket. The space between fuel tanks is filled by distance elements.

However, in this prior art, the fuel tanks are exposed to the outside, so that there is a risk that the fuel tanks collide with an external object and be damaged, or are in contact with a corrosive material and are corroded, thus leading to fuel leaks from the fuel tanks.

SUMMARY

An object of the present disclosure is to provide a fuel storage assembly supporting a plurality of fuel tanks that is capable of protecting the fuel tanks from the outside.

According to a first aspect of the disclosure, the disclosure relates to a fuel storage assembly for a motor vehicle comprising:

- four fuel tanks arranged to form each a corner of a substantially square cross-section of a tank array, the tank array being defined by two horizontal peripheral sides, respectively a top side and a bottom side, and two vertical peripheral sides, respectively a left side and a right side,
- a spacer arrangement configured to keep said fuel tanks apart, said spacer arrangement comprising at least one side bracket disposed along one of the vertical peripheral sides of the tank array, the at least one side bracket being arranged to be fixed to a vehicle chassis, and at least one central bracket disposed between the fuel tanks in the center of the tank array,

- at least one tensioning strap disposed around the fuel tanks and configured to be secured at one first end to a top part of the at least one side bracket and at one second end to a bottom part of the at least one side bracket, the at least one tensioning strap pressing the fuel tanks together in the tank array,
- a protecting element configured to cover at least partially one or more of the horizontal and vertical peripheral sides of the tank array, the protecting element being detachably fixed to the at least one tensioning strap.

The first aspect of the disclosure may seek to provide a fuel storage assembly supporting a plurality of fuel tanks that is capable of protecting the fuel tanks from the outside. A first technical benefit of the disclosure may include the use of a protecting element to cover the fuel tanks. A second technical benefit of the disclosure may include the removable connection of the protecting element to a tensioning strap that presses the fuel tanks together, thus reducing the number of parts of the fuel storage assembly and optimizing the volume of the fuel storage assembly.

Optionally in some examples, including in at least one preferred example, the protecting element is detachably fixed to the at least one tensioning strap through at least two linking elements, respectively a first linking element disposed at the bottom or top side of the tank array and a second linking element disposed at the left or right side of the tank array. A technical benefit of the disclosure may include the use of a limited number of linking elements to connect the protecting element to the tensioning strap, thus reducing the time for mounting the fuel storage assembly.

Optionally in some examples, including in at least one preferred example, each linking element is a bolt adapted to pass through a corresponding through-hole formed in the protecting element and cooperate with a corresponding nut provided in the at least one tensioning strap.

Optionally in some examples, including in at least one preferred example, the at least one tensioning strap extends between a first looped end and a second looped end, the first looped end enclosing a first pin, onto which is screwed a threaded connecting element at a first end thereof, a second end thereof being screwed to a second pin, which fits into bores in a U-shaped portion of the at least one side bracket.

Optionally in some examples, including in at least one preferred example, the second looped end encloses a pin, which fits into bores in a U-shaped portion of the at least one side bracket.

Optionally in some examples, including in at least one preferred example, the at least one side bracket comprises two support surfaces, each of which is adapted to lie against an outer surface of a fuel tank.

Optionally in some examples, including in at least one preferred example, the at least one side bracket has a central portion positioned between an upper portion and a lower portion of said at least one side bracket, said upper and lower portions each including a support surface, said central portion having a greater dimension along a lateral direction than said upper and lower portions.

Optionally in some examples, including in at least one preferred example, the at least one central bracket comprises four support surfaces, each of which is adapted to lie against an outer surface of a fuel tank.

Optionally in some examples, including in at least one preferred example, the at least one central bracket has a X-shaped profile defined by four vertices, two adjacent vertices being linked by a support surface.

Optionally in some examples, including in at least one preferred example, each support surface of the at least one side bracket and/or of the at least one central bracket has a circular arc shape.

Optionally in some examples, including in at least one preferred example, each support surface of the at least one side bracket and/or of the at least one central bracket is covered at least partially by a band-shaped panel adapted to prevent the fuel tanks from slipping.

Optionally in some examples, including in at least one preferred example, the band-shaped panel is formed in a high friction material.

Optionally in some examples, including in at least one preferred example, the high friction material is a rubber material.

According to a second aspect of the disclosure, the disclosure relates to a vehicle comprising a fuel storage assembly as above defined.

Optionally in some examples, including in at least one preferred example, the vehicle is a truck.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

An example is described in more detail below with reference to the appended drawings.

DETAILED DESCRIPTION

The detailed description set forth below provides information and examples of the disclosed technology with sufficient detail to enable those skilled in the art to practice the disclosure.

The invention will be described below for a vehicle in the form of a truck such as the truck 1 illustrated in FIG. 1 and FIG. 2. The truck 1 should be seen as an example of a vehicle that could comprise a fuel storage assembly in accordance with the present invention. However, a fuel storage assembly in accordance with an embodiment of the present invention may be implemented in a plurality of different types of vehicles. Purely by way of example, a fuel storage assembly according to the present invention could be connected to a truck, a tractor, a car, a bus, a work machine such as a wheel loader or any other type of construction equipment.

Figure 1:
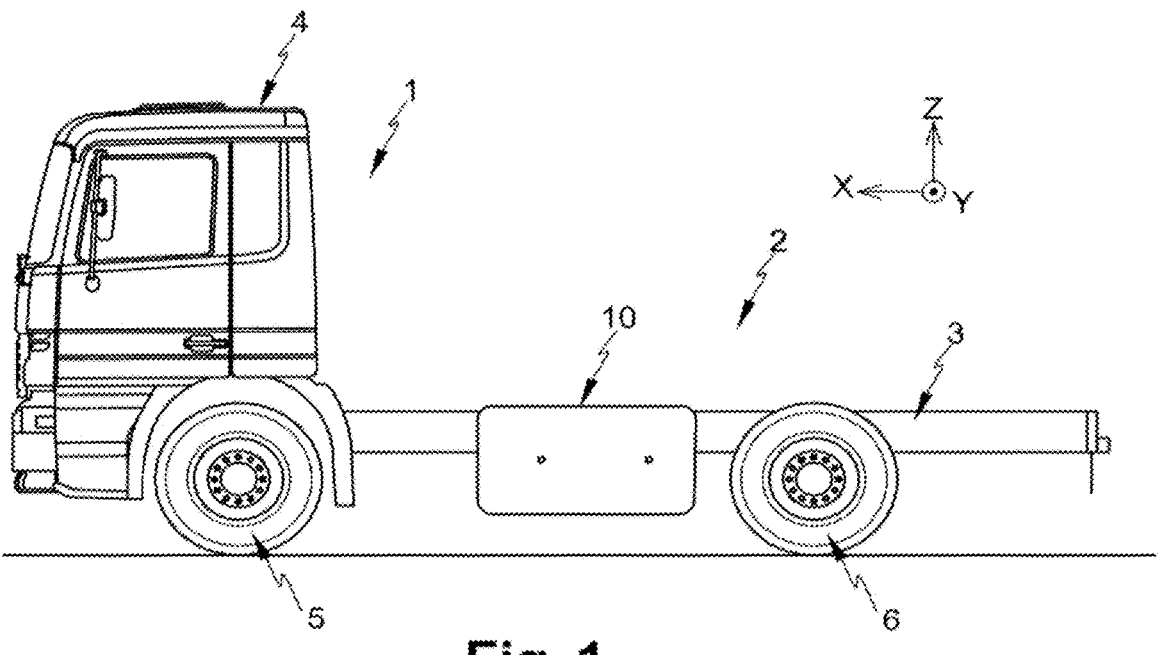
FIG. 1 is a schematic side view of a vehicle comprising a fuel storage assembly according to the present invention.
Figure 2:
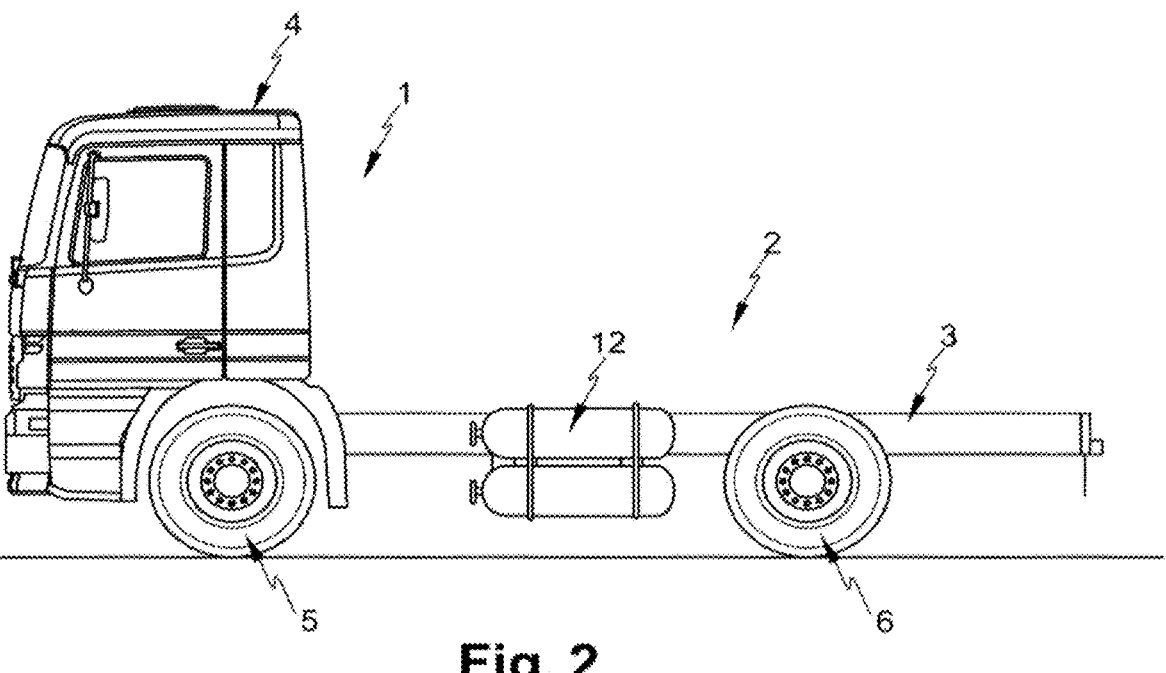
FIG. 2 is a schematic side view of the vehicle of FIG. 1, in which the protecting element is not illustrated.

FIG. 1 and FIG. 2 show schematic side views of a truck 1 having a chassis 2 with two elongated parallel side beams 3, the chassis 2 supporting a cabin 4 and two pairs of wheels, respectively a pair of front wheels 5 and a pair of rear wheels 6. Four gas tanks 12 (only two being visible in FIG. 2) storing compressed gas are fastened to one of the side beams 3 by means of a fuel storage assembly 10 that is mounted along the side beam 3 between the front wheels 5 and the rear wheels 6. The longitudinal, lateral and vertical dimensions of the fuel storage assembly 10 may be limited to be in accordance with legal requirements that specify the maximum permissible vehicle width and to prevent the fuel storage assembly 10 from extending too far above and below the side beam 3. Hereinafter, a longitudinal direction will be referred as a direction parallel to the axis X illustrated in FIG. 1, the axis X being defined as corresponding to a main axis of the truck 1, i.e. the direction of travel of the truck. In the following description, "front", "back" and "rear" refer to the longitudinal axis X. A lateral direction will be referred as a direction parallel to the axis Y illustrated in FIG. 1, the axis Y being defined as a width axis of the truck 1, and is perpendicular to the longitudinal axis X. In the following description, "left" and "right" refer to the transversal axis Y. A vertical dimension will be referred as a direction parallel to the axis Z illustrated in FIG. 1, the axis Z being defined as a vertical axis when the truck 1 lies on flat ground. In the following description, "vertical", "up", "down", "low" and "above" refer to the vertical axis Z. The vertical axis Z is perpendicular to the axes X and Y, which are therefore horizontal. In the following description, "horizontal" refers to any element comprised in a plane perpendicular to the axis Z.

Figure 3:
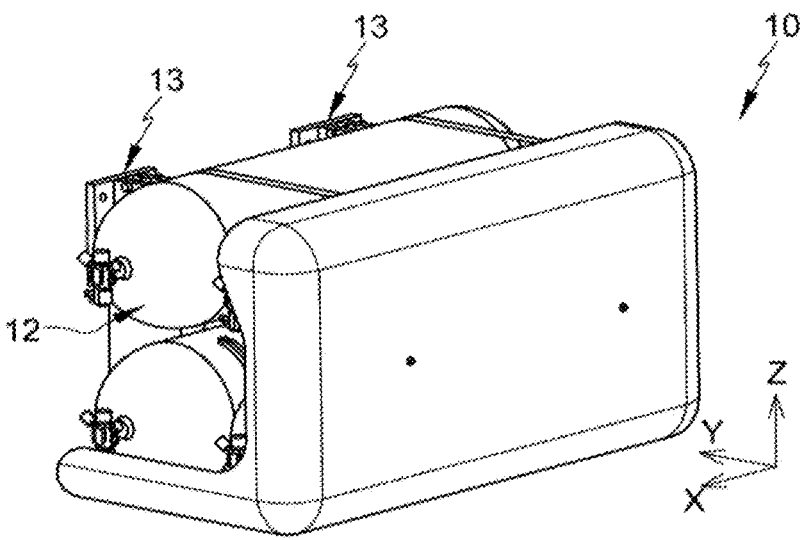
FIG. 3 is a perspective view of a fuel storage assembly according to an example of the present invention.
Figure 4:
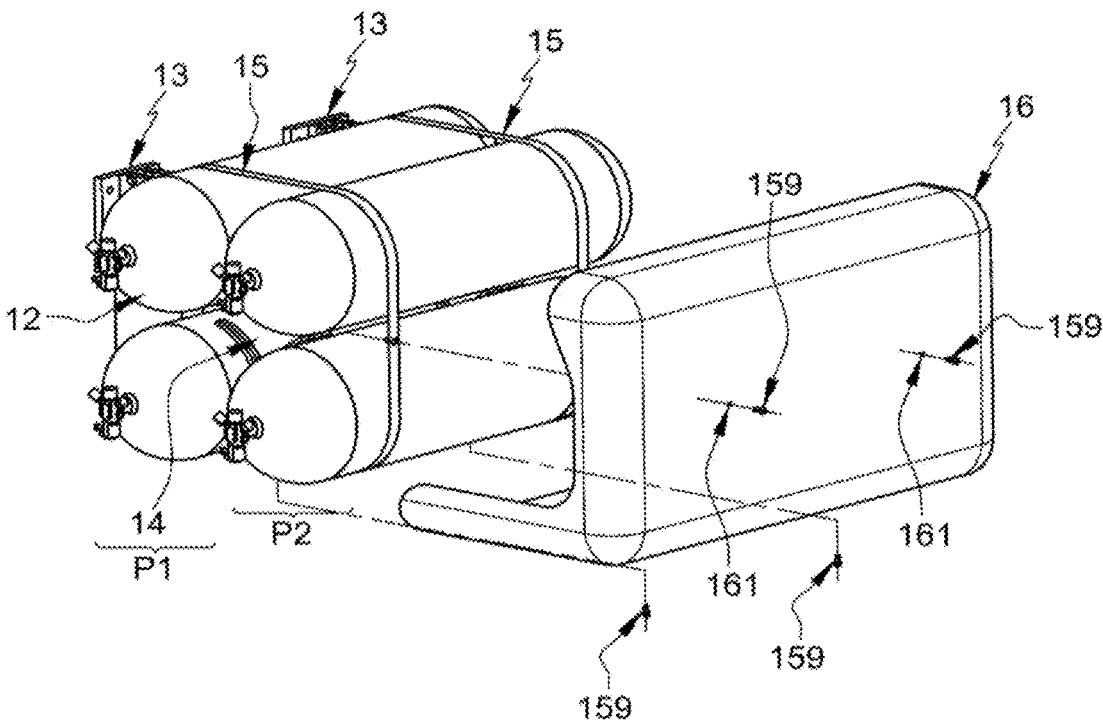
FIG. 4 is a partially exploded view of the fuel storage assembly illustrated in FIG. 3.
Figure 5:
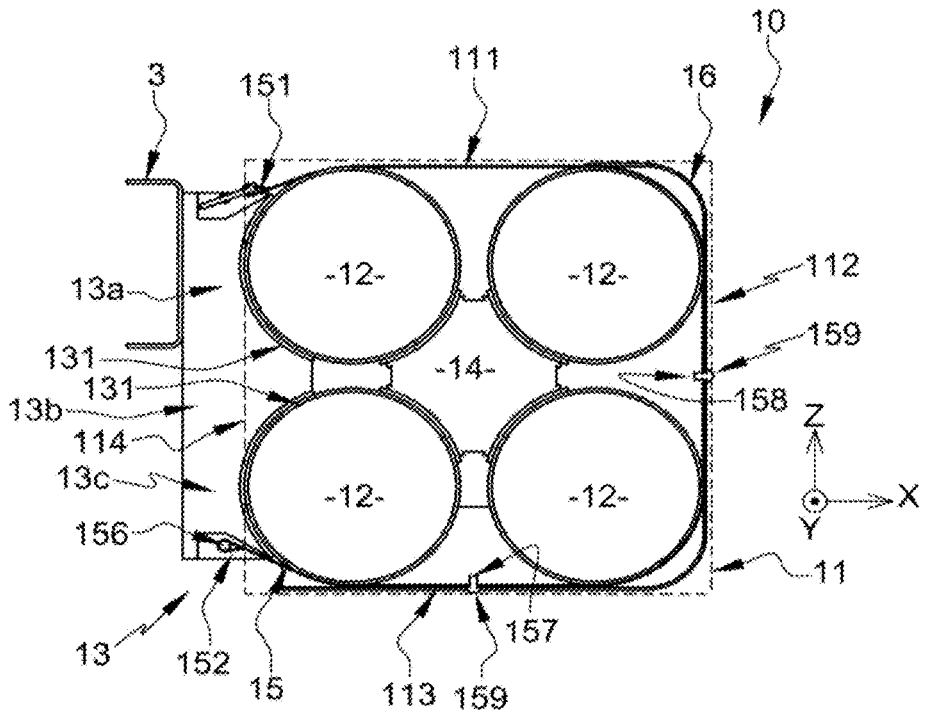
FIG. 5 is a sectional view of the fuel storage assembly illustrated in FIG. 3.

As illustrated in FIG. 3, FIG. 4 and FIG. 5, a fuel storage assembly 10 according to an exemplary embodiment of the present invention may include two pairs of elongated fuel tanks 12, respectively a first pair P1 of fuel tanks 12 that are positioned proximately from a side beam 3 of the vehicle and a second pair P2 of fuel tanks 12 that are positioned distally from said side beam 3. The fuel tanks 12 may have a cylindrical shape and extend along a longitudinal direction.

The assembly 10 may include two side brackets 13, which are spaced apart from each other along a longitudinal direction and disposed between the first pair P1 of fuel tanks 12 and the side beam 3. The side brackets 13 may be made of metal, preferably of steel. Each side bracket 13 is adapted to be fixed to the side beam 3 and is configured to stably support the fuel tanks 12 of the first pair P1 such that any movement of said fuel tanks 12 relative to each one of the side brackets 13 is prevented. Thus, each side bracket 13 may have a central portion 13b positioned between an upper portion 13a and a lower portion 13c, the central portion 13b having a greater dimension along a lateral direction than the upper and lower portions 13a, 13c. The upper and lower portions 13a, 13c each include a support surface 131 facing a fuel tank 12. Said support surface 131 may advantageously be formed so as to correspond to the outer circumferential surface of the fuel tank 12. That is, when the fuel tank 12 is formed in a cylindrical shape, the support surface 131 may be formed in a curved surface bent in a circular arc shape in a circumferential direction of the fuel tank 12.

Figures 8, 9:
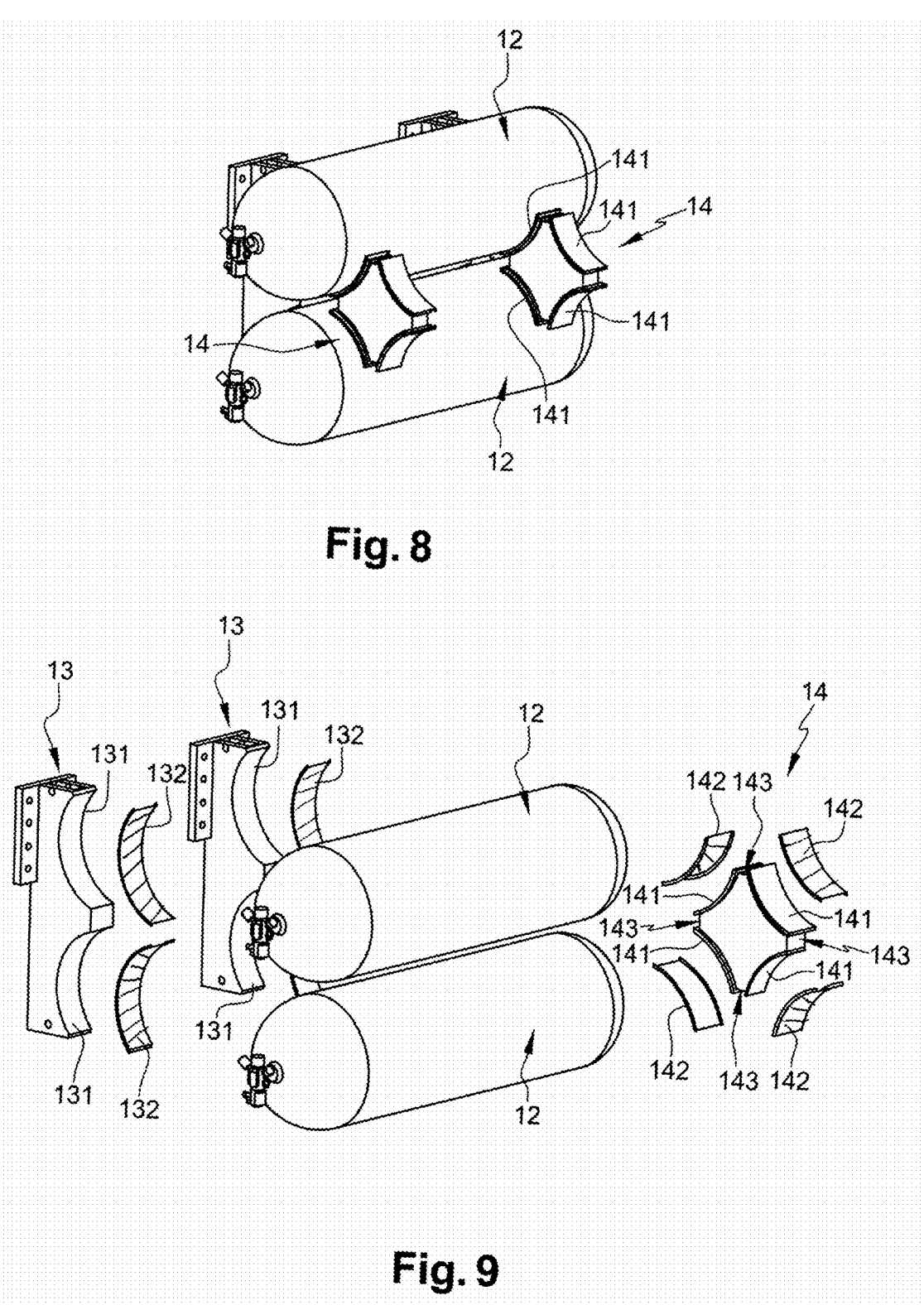
FIG. 8 is a perspective view of the fuel storage assembly illustrated in FIG. 3, in which the protecting element, the tensioning straps and the distal pair of fuel tanks are not illustrated.
FIG. 9 is an exploded view of the fuel storage assembly illustrated in FIG. 3, in which the protecting element, the tensioning straps and the distal pair of fuel tanks are not illustrated.

As illustrated in FIG. 9, each support surface 131 may advantageously be at least partially covered by a band-shaped panel 132, which is adapted to prevent the fuel tanks 12 from slipping. The band-shaped panel 132 may be formed of a high friction material, such as a rubber material.

The assembly 10 may also comprise two central brackets 14, which are spaced apart from each other along a longitudinal direction and disposed between the two pairs P1, P2 of fuel tanks 12. The central brackets 13 may be made of metal, preferably of steel. Each central bracket 14 is configured to stably support the fuel tanks 12 of the first and second pairs P1, P2 such that any movement of the fuel tanks 12 relative to each other is prevented. As illustrated in FIG. 8, each central bracket 14 may have a X-shaped profile defined by four vertices 143 and may include four support surfaces 141 disposed between the vertices 143, each support surface 141 facing a fuel tank 12. Each support surface 141 may advantageously be formed so as to correspond to the outer circumferential surface of the fuel tank 12. That is, when the fuel tank 12 is formed in a cylindrical shape, each support surface 141 may be formed in a curved surface bent in a circular arc shape in a circumferential direction of the fuel tank 12.

As illustrated in FIG. 9, each support surface 141 may advantageously be at least partially covered by a band-shaped panel 142, which is adapted to prevent the fuel tanks 12 from slipping. The band-shaped panel 142 may be formed of a high friction material, such as a rubber material.

The fuel tanks 12 are pressed together against the side brackets 13 and the central brackets 14 via two tensioning straps 15, which are spaced apart from each other along a longitudinal direction. The tensioning straps 15 may be made of metal, preferably of steel, the side thereof facing the fuel tanks 12 being advantageously covered by a high friction material, such as a rubber material, which is adapted to prevent the fuel tanks 12 from slipping. Each tensioning strap 15 is disposed around the four fuel tanks 12, one first end 151 thereof being secured to a top part of one side bracket 13 and one second end 152 thereof being secured to a bottom part of said side bracket 13.

As illustrated in FIG. 5, each tensioning strap 15 may form a loop at its first and second ends 151, 152. The second end 152 may enclose a pin 156, which fits into bores (not shown) in a U-shaped portion of the side bracket 3. The pin 156 may have thinner portions close to the ends for seating in the bores so as to prevent the pin 156 from escaping from the bores. Locking rings, collars or similar can also be used for this purpose.

Figure 6:
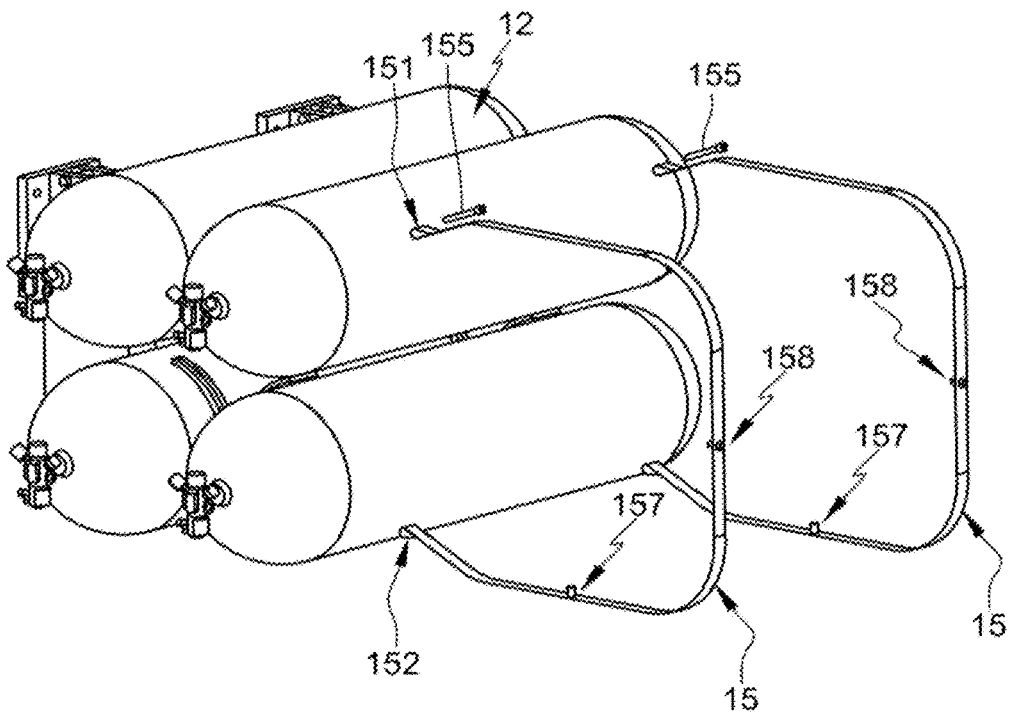
FIG. 6 is a partially exploded view of the fuel storage assembly illustrated in FIG. 3, in which the protecting element is not illustrated.
Figure 7:
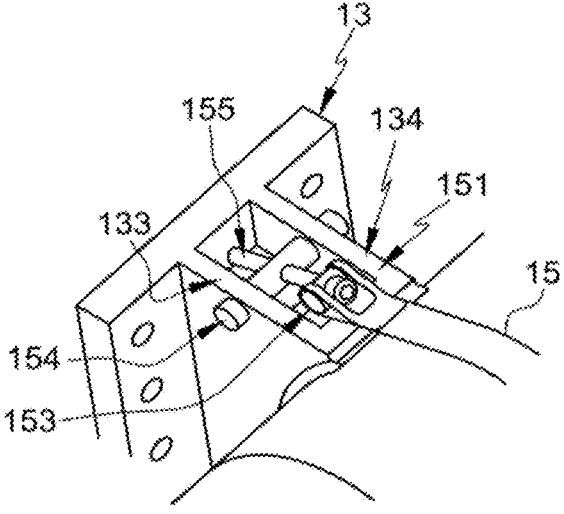
FIG. 7 is an enlarged view of the top end of one tensioning strap of the fuel storage assembly illustrated in FIG. 3.

As illustrated in FIG. 6 and FIG. 7, the first end 151 may enclose a pin 153, which extends along a longitudinal direction. A threaded connecting element 155, such as a bolt, is screwed at a first end onto the pin 153, an axis defined by the connecting element 155 being transversal to the longitudinal direction of the pin 153. A second end of the connecting element 155 may be screwed to a pin 154, which fits into bores in a U-shaped portion of the side bracket 3, the U-shaped portion being defined by a pair of vertical walls 133, 134. The pin 154 may have thinner portions close to the ends for seating in the bores so as to prevent the pin 154 from escaping from the bores. Locking rings, collars or similar can also be used for this purpose. The tensioning straps 15 may thus be tightened or relaxed by means of the connecting element 155.

In the tightened state of the tensioning straps 15, illustrated in FIG. 5, the four fuel tanks 12 of the assembly 10 form each a corner of a substantially square cross-section of a tank array 11, the tank array 11 being defined by two horizontal peripheral sides, respectively a top side 111 and a bottom side 113, and two vertical peripheral sides, respectively a left side 112 and a right side 114.

As illustrated in FIG. 5 and FIG. 6, each tensioning strap 15 may include fastening recesses 157, 158 configured to define nuts, to which linking elements 159, such as bolts, as illustrated in FIG. 4, are fastened. The linking elements 159 are adapted to detachably fix a protecting element 16 to the tensioning straps 15. For this purpose, corresponding through-holes 161 may be formed in the protecting element 16, said through-holes 161 being aligned with the fastening recesses 157, 158 of the tensioning straps 15 to permit the bolts 159 passing through the through-holes to be fastened to the fastening recesses 157, 158. In the embodiment shown, first linking elements 159 may be disposed at the bottom side 113 of the tank array 11 and second linking elements 159 may be disposed at the left side 112 of the tank array 11. The protecting element 16 is configured to cover at least partially one or more of the horizontal and vertical peripheral sides 111-114 of the tank array 11. The protecting element 16 thus protects the fuel tanks 12 from the outside. In particular, the protecting element 16 prevents the fuel tanks 12 from colliding with an external object and being damaged, and/or from being in contact with a corrosive material and being corroded.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A fuel storage assembly for a motor vehicle comprising:
   four fuel tanks arranged to form each a corner of a substantially square cross-section of a tank array, the tank array being defined by two horizontal peripheral sides, respectively a top side and a bottom side, and two vertical peripheral sides, respectively a left side and a right side,
   a spacer arrangement configured to keep the fuel tanks apart, the spacer arrangement comprising at least one side bracket disposed along one of the vertical peripheral sides of the tank array, the at least one side bracket being arranged to be fixed to a vehicle chassis, and at least one central bracket disposed between the fuel tanks in the center of the tank array,
   at least one tensioning strap disposed around the fuel tanks and configured to be secured at one first end to a top part of the at least one side bracket and at one second end to a bottom part of the at least one side bracket, the at least one tensioning strap pressing the fuel tanks together in the tank array, wherein the at least one tensioning strap comprises fastening recesses configured to receive linking elements,
   a protecting element configured to cover at least partially one or more of the horizontal and vertical peripheral sides of the tank array, the protecting element being detachably fixed directly to the at least one tensioning strap by the linking elements such that removal of the protecting element does not alter a compressive preload applied by the tensioning strap to the fuel tanks,
   the at least one tensioning strap is made of metal, a side thereof facing the fuel tanks is covered by a high friction material.

2. The fuel storage assembly of claim 1, wherein the protecting element is detachably fixed to the at least one tensioning strap through at least two linking elements, respectively a first linking element disposed at the bottom or top side of the tank array and a second linking element disposed at the left or right side of the tank array.

3. The fuel storage assembly of claim 2, wherein each linking element is a bolt adapted to pass through a corresponding through-hole formed in the protecting element and cooperate with a corresponding nut provided in the at least one tensioning strap.

4. The fuel storage assembly of claim 1, wherein the at least one tensioning strap extends between a first looped end and a second looped end, the first looped end enclosing a first pin, onto which is screwed a threaded connecting element at a first end thereof, a second end thereof being screwed to a second pin, which fits into bores in a U-shaped portion of the at least one side bracket.

5. The fuel storage assembly of claim 4, wherein the second looped end encloses a pin, which fits into bores in a U-shaped portion of the at least one side bracket.

6. The fuel storage assembly of claim 1, wherein the at least one side bracket comprises two support surfaces, each of which is adapted to lie against an outer surface of a fuel tank.

7. The fuel storage assembly of claim 6, wherein the at least one side bracket has a central portion positioned between an upper portion and a lower portion of the at least one side bracket, the upper and lower portions each including a support surface, the central portion having a greater dimension along a lateral direction than the upper and lower portions.

8. The fuel storage assembly of claim 7, wherein each support surface of the at least one side bracket and/or of the at least one central bracket has a circular arc shape.

9. The fuel storage assembly of claim 7, wherein each support surface of the at least one side bracket and/or of the at least one central bracket is covered at least partially by a band-shaped panel adapted to prevent the fuel tanks from slipping.

10. The fuel storage assembly of claim 9, wherein the band-shaped panel is formed in a high friction material.

11. The fuel storage assembly of claim 10, wherein the high friction material is a rubber material.

12. The fuel storage assembly of claim 1, wherein the at least one central bracket comprises four support surfaces, each of which is adapted to lie against an outer surface of a fuel tank.

13. The fuel storage assembly of claim 12, wherein the at least one central bracket has a X-shaped profile defined by four vertices, two adjacent vertices being linked by a support surface.

14. A vehicle comprising a fuel storage assembly according to claim 1.

15. The vehicle of claim 14, wherein the vehicle is a truck.

* * * * *